United States Patent [19]

Walker

[11] Patent Number: 5,020,271
[45] Date of Patent: Jun. 4, 1991

[54] WATERING DEVICES

[76] Inventor: David A. Walker, 269 Fig Tree Pocket Road, Fig Tree Pocket, Queensland, Australia

[21] Appl. No.: 515,710

[22] Filed: Apr. 27, 1990

[30] Foreign Application Priority Data

Apr. 28, 1989 [AU] Australia ............................ PJ3904
Oct. 11, 1989 [AU] Australia ............................ PJ6801

[51] Int. Cl.[5] ............................................ A01G 13/00
[52] U.S. Cl. ......................................... 47/27; 47/25; 47/32
[58] Field of Search .......................... 47/25, 32, 27

[56] References Cited

U.S. PATENT DOCUMENTS 4,545,145 10/1985 Torrance ............................ 47/48.5

Primary Examiner—Henry E. Raduazo
Attorney, Agent, or Firm—Foley & Lardner

[57] ABSTRACT

A watering device comprising a flexible plastic bag with inlet and outlet necks whereby the bag may be filled and enabled to trickle water therefrom. The outlet neck is provided with a wick material and it is supported at a point therealong above the water level in the device so as to control the rate of outflow. The watering device is a split bag to encompass the base of a tree.

10 Claims, 2 Drawing Sheets

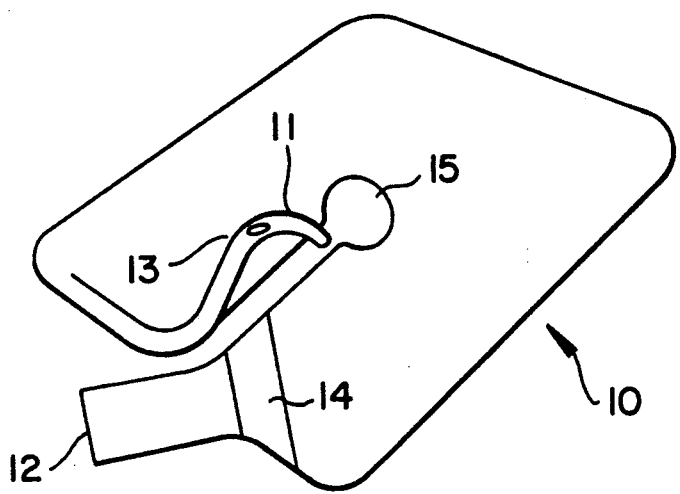
FIG. 1
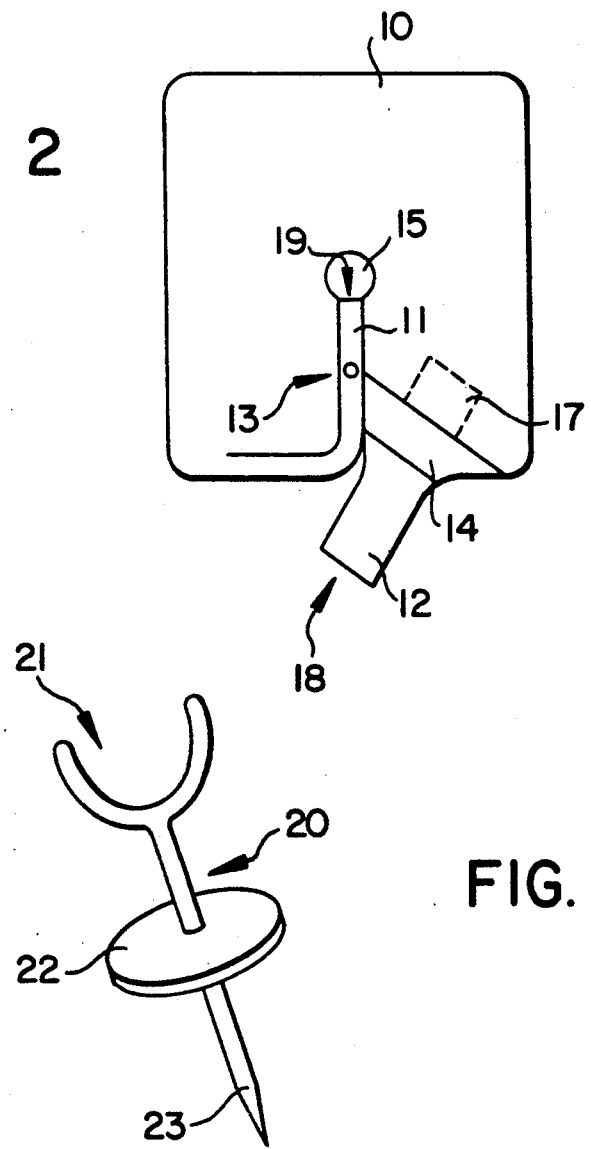
FIG. 2
FIG. 3

WATERING DEVICES

THIS INVENTION relates to watering devices and in particular to devices suited to trickle watering plants.

PRIOR ART

Prior patent specification, U.S. Pat. No. 4545145 (Torrance), sets out a plant watering device prepared from sheet plastic material which is refillable and can be placed at the base of a plant, such as a young tree, to maintain soil moisture for a period of time by means of a controlled outlet. Whilst this device is adequate for its purpose, there is scope for further improvement, particularly with regard to the control of the rate of delivery of liquid. Torrance provides a means of clamping the outlet tube to control flow.

OBJECT OF THE INVENTION

It is an object of the present invention to provide a watering device which enables ease in filling and which is readily controlled at the outlet. Other objects and various advantages of the invention will hereinafter become apparent.

OUTLINE OF THE INVENTION

The invention achieves its objects in provision of a watering device comprising:
- a storage container for holding a volume of fluid;
- a filling spout associated with the storage container whereby the container may be filled;
- an outlet associated with the container whereby fluid may be dispensed therefrom; and
- a liquid outlet support means;
- the outlet comprising an elongate neck filled with a material that acts as a wick in respect of the fluid;
- the storage container comprising a shape adapted to lie adjacent a site whereat fluid is to be dispensed; and
- the elongate neck being of sufficient length that it may be passed to the site over or from a height greater than the fluid level in the container;
- the liquid outlet support means enabling setting of the height of the neck.

In provision of a fluid dispensing means of the above character such a product may be manufactured from sheet plastic material whereas is provided the basic shape of the container and its inlet and outlet necks. A fluid retentive container may be formed from two such sheets, overlaid and heat sealed at their edges. The outlet neck may be provided with a suitable filler to act as a wick whereby outflow of fluid is controlled. The bag may be rectangular and slit to a central hole whereat the trunk of a shrub, bush or tree may be accommodated. In place, about the base of a plant, the fluid dispensing device may provide a mulching effect to both dispense water and restrict evaporation at the soil surface. The plastic material is ideally an ultra violet resistive material so as to last some time in the field. The container might be shielded by an overlay of straw or other like material.

BRIEF DESCRIPTION OF THE DRAWINGS

The invention will now be described with reference to a preferred embodiment as shown in the accompanying drawings in which:

FIG. 1 is a perspective view of a watering device in accordance with the the present invention;

FIG. 2 is a plan view of a watering device in accordance with the invention;

FIG. 3 is a view of a peg that can be used with the present invention; and

PREFERRED EMBODIMENTS

Figure 4:
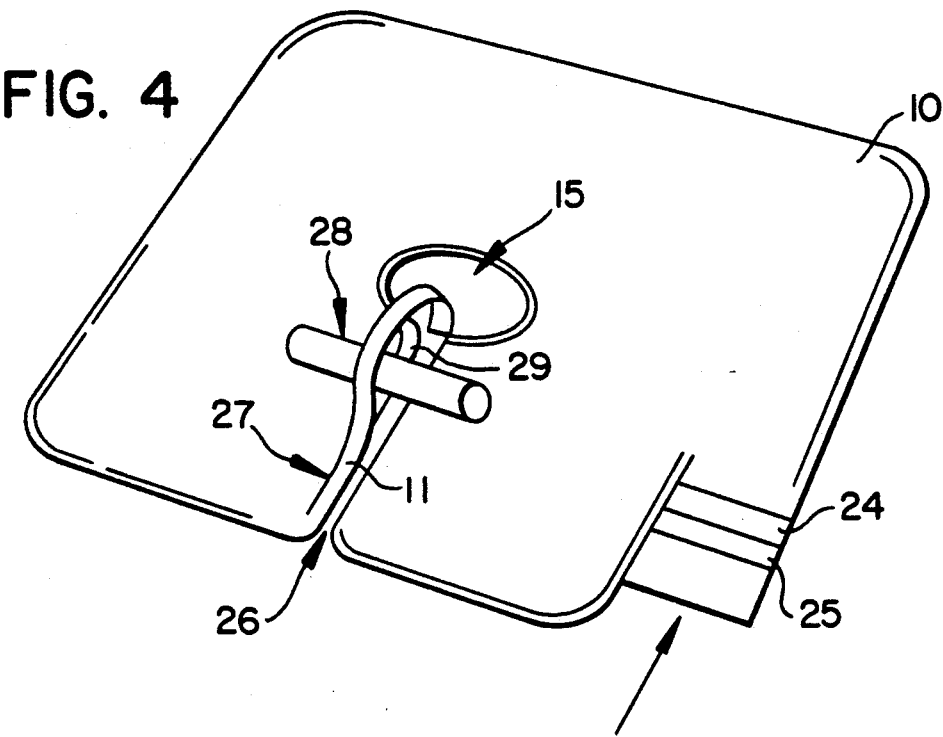
FIG. 4 shows another embodiment of the present invention.

In FIGS. 1 and 2, a bag 10 is provided with an outlet spout 11 and a filling inlet 12. The outlet spout has a hole 13 whose use is set out below. The filling inlet 12 is associated with a strap 14 under which it may be folded as shown in phantom at 17. The bag 10 has a central hole 15 to accommodate the trunk or main stem of a plant to be watered by the device.

The bag of the invention may be a plastic bag produced from sheet stock that is sufficiently strong to withstand handling when placed and filled with water. Being located outdoors in its usual use, the bag may then be produced from an ultraviolet light resistant plastic so that the bag does not degrade too quickly and is available for refilling and reuse over a considerable period of time.

In use of the bag, a two fold purpose is achieved in that the plant to which the invention is applied is trickle watered (as will become clear below) and ground around the base of the tree is shielded from light with the surface covered to prevent growth of competing weeds and other plants which might otherwise compete for the water being delivered to the target plant. If the bag be opaque it may also act as a heat shield to reduce evaporation.

In production of the bag, two sheets of identical shape might be stamped from sheet stock with a shape such as seen in FIG. 2. Of course, the external shape is not critical and any geometric shape might equally be employed except that a square, rectangular, hexagonal shape etc, enables cutting, stamping etc, of bag blanks from sheet stock with a minimum of waste. The upper and lower sheets are slit to provide the outlet neck 13 with a central hole 15 being cut away. The edges of the two sheets may be heat sealed, or otherwise interconnected to produce a watertight seal at all edges except at 18 (which provides the filler point) and 19 (which provides the outlet). In the process of sealing the edges, a strap 14 may be joined to the edges and a heat seal process will be adequate to attach strap 14 when using plastic material.

The outlet neck 11 may be provided with a mechanism by which outflow of water that is stored in the bag is controlled and in particular held down to a trickle at a predetermined rate. A means of achieving this involves inserting a wick material into the neck to control flow therealong. Whilst this limits flow to a degree it does not achieve control and for that purpose it is proposed to insert, in the neck, along with the wick, a resilient strap or filament such as a length of wire, which material may be bent into an arch-like shape, as seen in FIG. 1, which arch is held to keep the height of the neck at some point therealong above the water level in the bag so that there is more than a simple gravitational outflow along the neck as would occur if the neck were left lying at ground level. In the arch configuration, if the neck end be placed into the soil at the base of a plant, a syphon effect could develop and to break the effect a hole 13 can be provided in the neck. With these features in place, outflow is more a function of the wick material and the height of the arch. In practice a flow rate of 1200 mls/24 hrs with a full bag will drop to a figure around 634 mls/24 hrs when the bag is down to about 20% full. This is a fairly steady rate of flow over the total period of operation. The rate of flow is a factor of wick size and arch height. A higher arch slows the flow. A lower arch increases it. It is possible to cut off the outflow when desired by putting the end of the neck under the strap 14.

In the above described embodiment, the outlet neck may be bent into an arch shape and is able to retain that shape. In FIG. 3 is shown a means by which the outlet neck can be supported in an arch form by being passed over the fork 21 on the end of peg 20 which can be driven into the ground by pushing spike 23 to stand the peg. A stop 22 may be provided to achieve a preset height. Peg 20 is pushed into the ground up to the stop. The stop 22 can be made adjustable to enable preset variations in the height of the peg and the arch it establishes. Alternately a simple peg without stop may be provided with its height in use determined by eye.

The above described watering device is provided in a shape devised to closely surround a plant in the ground. Clearly, the bag could just as easily lie around a tree or bush in a pot. For smaller plants and small pots, smaller bags may be produced. The geometry of the bag may be varied to accommodate a pot top, with a round bag, or an elongate sausage-form that either has the curve required or can adapt to the curve of a pot top.

In order to fill the bag, the neck 12 is provided. It is open ended and of adequate size to enable filling. A hose might be inserted into the neck to fill the bag at the base of a plant and, when filled, the neck 12 is folded up under strap 14. The pressure of water in the filled bag bulging out against the strap 14 is adequate to seal the bag at this point without any further adaptation. If desired, the neck 12 could be folded on itself beneath the strap to further reduce the likelihood of seepage at this point. However, as the pressure of water is not great, the simple expedient of folding under the strap will be effective.

In the bag of FIG. 4, filler neck 24 is folded back under strap 25 in the same way as before to seal the bag 10. The filler neck is cut back into the side edge of a rectangular bag 10. This form of the bag 10 enables production with reduced waste. The filler tube 11 is cut back along the side of slot 26 and a wick feeds therealong back into the bag at 27. In order that the flow of water along the wick be controlled, a bridge piece 28 passes beneath the neck 11 and over the top surfaces of the bag 10 on each side of slot 26. When the bag is filled, and its top bulged upwardly, the bridge 28 raises the neck, and the bridge rides down with the bag as it collapses as water is dispensed therefrom. The height of the arched neck 11 is automatically adjusted.

In practice, the bridge 28 can be a length of plastic tubing with one end cut at an acute angle. The bridge then operates as a tool that can be used to push a hole into soil at the base of a plant in hole 15 to receive the end of neck 11 therein for best results. The bridge 28 may be held in place by, in forming neck 28, providing an additional layer of material beneath the neck partway therealong, which layer can be slotted to create a strap 29 that holds bridge 28 in place when it has been threaded therethrough. This additional layer may be the same material as bag 10 and, when plastic, it can be joined in the same process that heat seals the edges of the bag.

Figure 5:
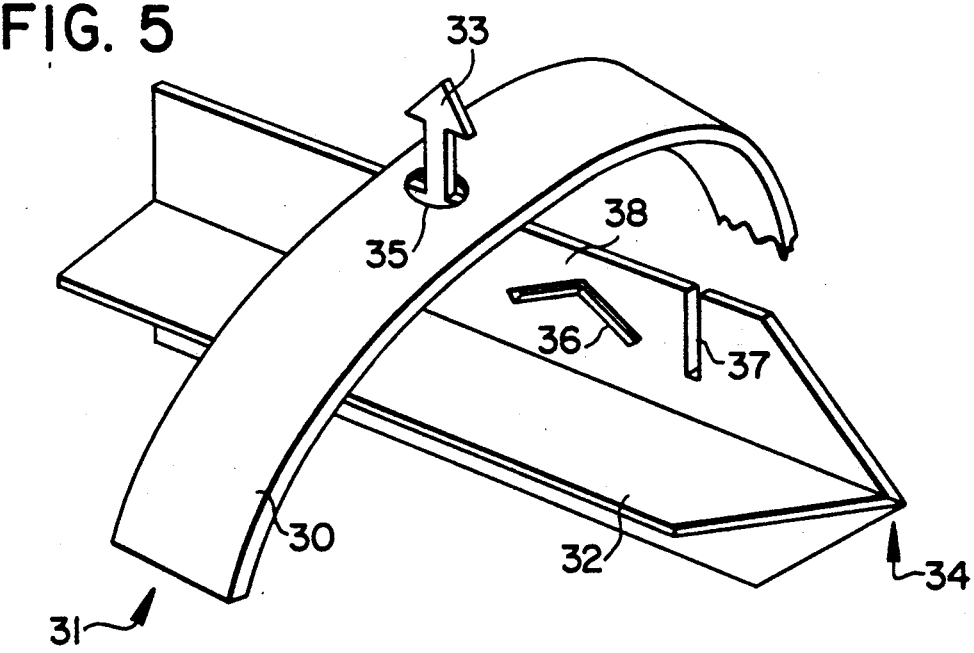
FIG 5 is a detail of a further embodiement in accordance with the present invention.

In FIG. 5 is shown an alternate device 32 which may perform the function of the bridge 28. Bridge device 32 may be a plastic molding with a T-section for strength with minimum material to save on costs. Bridge device 32 is shown with neck 30 passed thereover with outlet end 31 draped downwardly. A spur or barb 33 might be provided and this can be passed through the hole 35 which breaks the siphon effect in neck 30. The spur or barb 33 serves to hold the bridge and neck together in a more stable assembly. The end 34 of the bridge device 32 may be pointed to provide a means to form a hole for the neck 31 to be inserted into.

FIG. 5 also illustrates an alternate means of holding the neck 30. The flange 38 may be provided with a slot 36 therethrough instead of barb 33. The neck 30 may be passed through slot 36 to interconnect it with the bridge 32. The slot 36 may be V-shaped to produce a frictional interengagement with neck 30 so that the two parts do not readily slide past each other. As long as the neck is draped over the bridge with its outlet therebelow, a flow will occur. If it is desired to stop the flow, the outlet needs to be raised. The neck end might be conveniently raised and held by the neck end being raised up, turned round, and engaged in slot 37 to hold it. In this position the flow will cease.

In practice, with a bag of the above character produced from a flexible plastic material having a tacky surface it is best that the inlet neck (12 of FIG. 1 or 24 of FIG. 4) be formed with a length sufficient to enable the neck to be folded thrice, with the folded end inserted under the locking strap to hold the folded neck to the bag and seal it. A tacky surfaced plastic is not readily slid over itself under a locking strap.

Flow rates in the above embodiments can be controlled by factors such as the length of the neck from the bridge to the outlet and the depth to which it is extended.

The invention is described above with regard to preferred embodiements. It will be clear that the invention which is set out the following claims might be varied considerably within the scope of the claims as will be apparent to a man skilled in the art.

The claims defining the invention are as follows:

1. A fluid dispensing means comprising:
    a flexible bag-like storage container for holding a volume of fluid having a fluid level in said container and said container being shaped to lie adjacent a site whereat fluid is to be dispensed;
    a filling spout associated with the storage container whereby the fluid may be dispensed therefrom;
    an outlet comprising an elongate flexible neck having a base connected to said container, a wick inserted in said neck and extending therethrough to the storage container, said wick being of a material capable of transmitting fluid from said storage container to an outer end of said wick by capillary action;
    said elongate neck being of sufficient length that the neck and the wick in which it is inserted is at a height greater than the fluid level in the container, said neck being open to the atmosphere above said fluid level in the storage container so as to break any siphon effect; and
    means for supporting said elongate neck above said fluid level so that said neck and wick fall progressively with said fluid level in the storage container.

2. A fluid dispensing means as claimed in claim 1, wherein said filling spout comprises an open ended neck of flexible material, and said neck is attached to the container at a point provided with a strap beneath which the neck may be folded and sealably held to the bag.

3. A fluid dispensing means as claimed in claim 2, wherein said open ended neck has sufficient length that it may be thrice folded to establish a seal.

4. A fluid dispensing means as claimed in claim 3, wherein said strap overlies and extends across said base of said open ended neck.

5. A fluid dispensing means as claimed in claim 1, further including support means for supporting said flexible neck over the top of the storage container so that said open ended neck falls with the water level in said container.

6. A fluid dispensing means as claimed in claim 5, wherein said support means is an elongate member provided along an upper edge thereof with a prong, said prong being adapted to pass through an opening in said flexible neck for supporting and holding said neck.

7. A fluid dispensing means as claimed in claim 1, wherein said storage container is formed by two sheets of fluid impervious flexible material joined at their edges to form a unitary assembly comprised of said filling spout, storage container and said flexible neck.

8. A fluid dispensing means as claimed in claim 7, wherein said sheets are formed of ultra violet light resistant plastic, said sheets being heat sealed at their edges to form the container.

9. A fluid dispensing means comprising:
a storage container filled with fluid to predetermined height and formed by two sheets of fluid impervious flexible material joined at their edges to form a unitary assembly comprised of a filling spout, storage container and outlet;
said outlet comprising an elongate flexible neck provided with a siphon break, said outlet flexible neck being filled with a wick material which is passed to the site at which fluid is to be dispensed, and
support means for supporting said flexible neck at a height greater than the height of the fluid in the container, said support means resting upon said storage container so as to move therewith as the liquid level in said container falls.

10. A fluid dispensing means as claimed in claim 9, wherein the container is split from an edge of the container to a central hole, and said support means is an elongate member which spans the split.

* * * * *